United States Patent
Oshima et al.

(10) Patent No.: US 11,196,506 B2
(45) Date of Patent: Dec. 7, 2021

(54) INTERFERENCE SIGNAL GENERATION DEVICE, INTERFERENCE SIGNAL GENERATION SYSTEM, AND INTERFERENCE SIGNAL GENERATION METHOD

(71) Applicant: NEC Corporation, Tokyo (JP)

(72) Inventors: Naoki Oshima, Tokyo (JP); Shinichi Hori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/648,519

(22) PCT Filed: Sep. 21, 2018

(86) PCT No.: PCT/JP2018/035057
§ 371 (c)(1),
(2) Date: Mar. 18, 2020

(87) PCT Pub. No.: WO2019/059352
PCT Pub. Date: Mar. 28, 2019

(65) Prior Publication Data
US 2020/0266915 A1    Aug. 20, 2020

(30) Foreign Application Priority Data

Sep. 22, 2017  (JP) .............................. JP2017-182349

(51) Int. Cl.
*H04K 3/00* (2006.01)
*G01S 7/38* (2006.01)

(52) U.S. Cl.
CPC . *H04K 3/00* (2013.01); *G01S 7/38* (2013.01)

(58) Field of Classification Search
CPC .................................. H04K 3/00; G01S 7/38
See application file for complete search history.

(56) References Cited

U.S. PATENT DOCUMENTS

| 2006/0001779 | A1* | 1/2006 | Favrat ..................... H04N 5/46 348/725 |
| 2009/0227213 | A1* | 9/2009 | Sadeghfam ............ H04B 1/525 455/78 |
| 2018/0048293 | A1* | 2/2018 | Gathman ............. H04B 1/0053 |

FOREIGN PATENT DOCUMENTS

| JP | 04-108228 | A |   | 4/1992 |   |
| JP | 05-091088 | A |   | 4/1993 |   |
| JP | 2003294830 | A | * | 9/2003 |   |
| JP | 2003-294830 | A |   | 10/2003 |   |
| JP | 2004-304288 | A |   | 10/2004 |   |
| JP | 2004304288 | A | * | 10/2004 |   |
| WO | WO-2018207499 | A1 | * | 11/2018 | ............... H04B 1/00 |

OTHER PUBLICATIONS

International Search Report for PCT/JP2018/035057 dated Dec. 11, 2018 [PCT/ISA/210].
Written Opinion for PCT/JP2018/035057 dated Dec. 11, 2018 [PCT/ISA/237].

* cited by examiner

*Primary Examiner* — Dong-Chang Shiue
(74) *Attorney, Agent, or Firm* — Sughrue Mion, PLLC

(57) ABSTRACT

An interference signal generation device includes a first converter configured to perform conversion on a frequency of an input signal based on a center frequency of a frequency band to be interfered, and a second converter configured to further perform conversion on a frequency of an output signal of the first converter based on the center frequency.

10 Claims, 16 Drawing Sheets

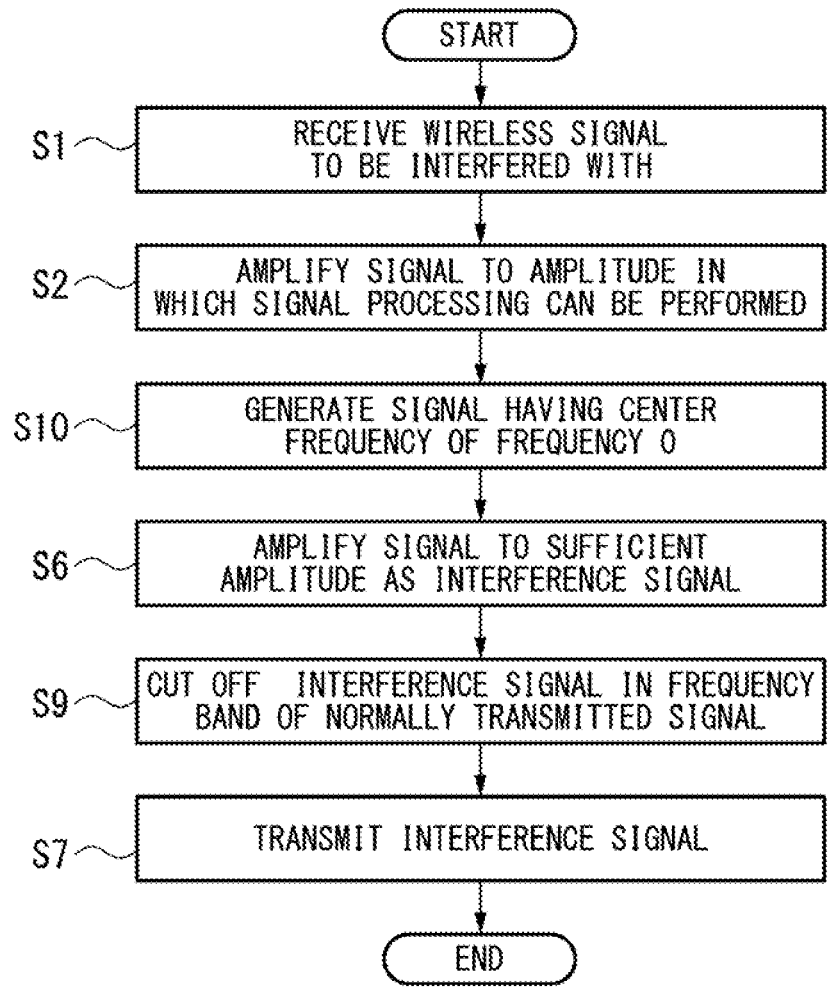
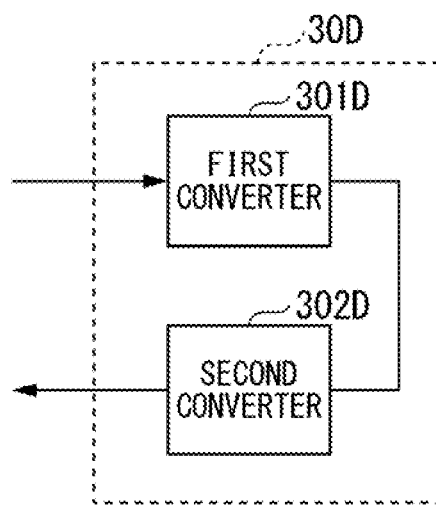

INTERFERENCE SIGNAL GENERATION DEVICE, INTERFERENCE SIGNAL GENERATION SYSTEM, AND INTERFERENCE SIGNAL GENERATION METHOD

CROSS REFERENCE TO RELATED APPLICATIONS

This application is a National Stage of International Application No. PCT/JP2018/035057 filed Sep. 21, 2018, claiming priority based on Japanese Patent Application No. 2017-182349 filed Sep. 22, 2017.

TECHNICAL FIELD

The present invention relates to an interference signal generation device, an interference signal generation system, and an interference signal generation method.

BACKGROUND ART

Wireless communication is performed in various frequency bands according to the use of mobile phones, TV broadcasting, amateur radio, and the like in recent years. Wireless communication has an advantage that communication can be performed anywhere that radio waves can reach. On the other hand, wireless communication is possible anywhere radio waves can reach. For this reason, in a test hall, a concert hall, or the like, there is a disadvantage that the power of a mobile phone or the like must be turned off so as not to trouble others due to ring tones, calls, or the like.

Patent Document 1 describes a technology for generating an interference signal that interferes with wireless communication as a related technology.

PRIOR ART DOCUMENTS

Patent Documents

[Patent Document 1] Japanese Unexamined Patent application, First Publication No. H05-091088

SUMMARY OF INVENTION

Problem to be Solved by the Invention

Incidentally, as one method of disturbing, that is, interfering with, wireless communication, for example, using an interference signal generated using the technology described in Patent Document 1 is conceivable. By the technology described in Patent Document 1, a received signal is stored and an interference signal is generated using the stored signal. For this reason, when the technology described in Patent Document 1 is used in a situation such as in a test hall or a concert hall is intended in which immediate interference with wireless communication, there is a possibility that processing takes time and an interference signal cannot be immediately generated.

An example object of the present invention is to provide an interference signal generation device, an interference signal generation system, and an interference signal generation method that can solve the problems described above.

Means for Solving the Problem

An interference signal generation device according to an example aspect of the present invention includes a first converter configured to perform conversion of a frequency of an input signal based on a center frequency of a frequency band which is to be interfered with, and a second converter configured to further perform conversion on a frequency of an output signal of the first converter based on the center frequency.

In addition, an interference signal generation system according to another example aspect of the present invention includes a first antenna configured to receive a signal, a first amplifier configured to amplify the signal received by the first antenna, the interference signal generation device mentioned above, which is configured to receive the signal amplified by the first amplifier, a second amplifier configured to amplify an output signal of the interference signal generation device, and a second antenna configured to transmit the signal amplified by the second amplifier.

In addition, an interference signal generation method according to still another example aspect of the present invention includes performing conversion on a frequency of an input signal based on a center frequency of a frequency band which is to be interfered with, and performing further conversion on the converted frequency of a signal based on the center frequency.

Moreover, an interference signal generation method according to still another example aspect of the present invention includes generating a second signal by amplifying a first signal received by a first antenna, converting a frequency of the second signal into a third signal based on a center frequency of a frequency band to be interfered with, converting further a frequency of the third signal into a fourth signal based on the center frequency, generating a fifth signal by amplifying the fourth signal, and transmitting the fifth signal from a second antenna.

Effect of the Invention

According to any one of the example aspects described above, when a signal to be interfered with is detected, it is possible to immediately generate an interference signal.

BRIEF DESCRIPTION OF THE DRAWINGS

FIG. 14 is a diagram which shows a processing flow of the interference signal generation system according to the sixth example embodiment of the present invention.

FIG. 15 is a diagram which shows a configuration of an interference signal generation device according to another example embodiment of the present invention.

EMBODIMENTS FOR CARRYING OUT THE INVENTION

Hereinafter, each example embodiment of the present invention will be described in detail with reference to the drawings.

An interference signal generation system 1 according to each example embodiment of the present invention is a system in which it is possible to immediately generate an interference signal of a frequency band that interferes with wireless communication. Note that the interference signal generation system 1 according to first to third example embodiments of the present invention shows an example in which a technology of a direct conversion method in which down-conversion and up-conversion are performed is used. In addition, the interference signal generation 1 according to fourth to sixth example embodiments of the present invention shows an example of a case in which a technology of down-conversion using a single mixer is used.

First Example Embodiment

First, a configuration of the interference signal generation system 1 according to the first example embodiment of the present invention will be described.

Figure 1:
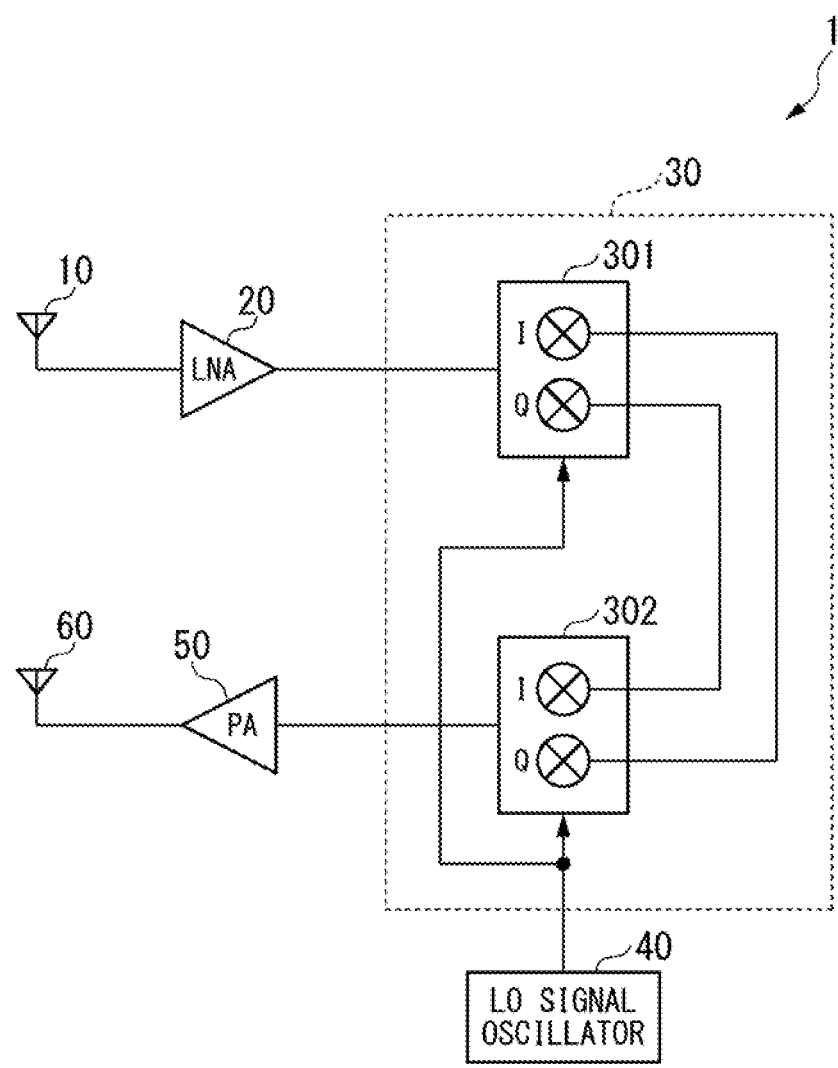
FIG. 1 is a diagram which shows a configuration of an interference signal generation system according to a first example embodiment of the present invention.

The interference signal generation system 1 according to the first example embodiment of the present invention is a system in which it is possible to immediately generate, when wireless signals to be interfered with are detected, an interference signal that interferes with communication of the wireless signals. The interference signal generation system 1, as shown in FIG. 1, includes a first antenna 10, a low noise amplifier (LNA) 20 (an example of a first amplifier), an interference signal generation device 30, a local oscillator (LO) signal oscillator 40 (an example of a signal generator), a power amplifier (PA) 50 (an example of a second amplifier), and a second antenna 60. The interference signal generation system 1 is a system which is configured by an analog circuit.

The first antenna 10 receives wireless signals to be interfered with.

The LNA 20 amplifies the wireless signals received by the first antenna 10 to an amplitude that allows the interference signal generation device 30 to perform signal processing.

The interference signal generation device 30 is a device which generates an I signal and a Q signal which are orthogonal signals down-converted using direct conversion from the signal received from the LNA 20, and generates an IQ composite signal obtained by composing the I signal and Q signal which are up-converted after the generated I signal and Q signal are exchanged with each other.

The LO signal oscillator 40 generates an LO signal to be used when the interference signal generation device 30 performs down-conversion and up-conversion.

The PA 50 amplifies an output signal of the interference signal generation device 30 to a sufficient amplitude as an interference signal. The sufficient amplitude of an interference signal is an amplitude which needs to be amplified to have power at which interference radio waves can reach a predetermined range in which wireless communication is not intended to be performed.

The second antenna 60 transmits the signal amplified by the PA 50.

The interference signal generation device 30 includes a first IQ mixer 301 (an example of a first mixer) and a second IQ mixer 302 (an example of a second mixer).

The first IQ mixer 301 down-converts a high frequency (Radio frequency, RF) signal received from the LNA 20 using an LO signal by direct conversion, that is, converts the high frequency signal into a signal of a low frequency band, and generates an I signal and a Q signal. Note that, in each of the first IQ mixer 301 and the second IQ mixer 302, an LO signal input to a processing unit that processes the I signal and an LO signal input to a processing unit that processes the Q signal are signals whose phases are shifted by 90 degrees from each other.

The second IQ mixer 302 exchanges the I signal and the Q signal generated by the first IQ mixer 301. The second IQ mixer 302 up-converts the exchanged I signal and Q signal using an LO signal, that is, converts the exchanged I signal and Q signal to signals of high frequency bands. Then, the second IQ mixer 302 generates a composite signal of the up-converted I signal and Q signal.

Here, an exchange of the I signal and the Q signal performed by the second IQ mixer 302 will be described with reference to FIG. 1.

In the first IQ mixer 301 of a reception system in the case of performing communication in a direct conversion method using the I signal and the Q signal that are orthogonal signals, a signal path for performing signal processing on the I signal is set as a signal path I, and a signal path for performing signal processing on the Q signal is set as a signal path Q. In addition, in the second IQ mixer 302 of a transmission system in the case of performing communication in the direct conversion method using the I signal and the Q signal that are orthogonal signals, a signal path for performing signal processing on the I signal is set as a signal path I, and a signal path for performing signal processing on the Q signal is set as a signal path Q.

The exchange of the I signal and the Q signal using the second IQ mixer 302 is to connect the signal path I of the first IQ mixer 301 to the signal path Q of the second IQ mixer 302 and connect the signal path Q of the first IQ mixer 301 to the signal path I of the second IQ mixer 302 in the interference signal generation device 30 according to the first example embodiment of the present invention.

In other example embodiments of the present invention, the exchange of the I signal and the Q signal is not an exchange by a connection of signal paths between the first IQ mixer 301 and the second IQ mixer 302, but may be performed by a connection of signal paths inside the first IQ mixer 301 or a connection of signal paths inside the second IQ mixer 302.

Next, processing of the interference signal generation system 1 according to the first example embodiment of the present invention will be described.

Figure 2:
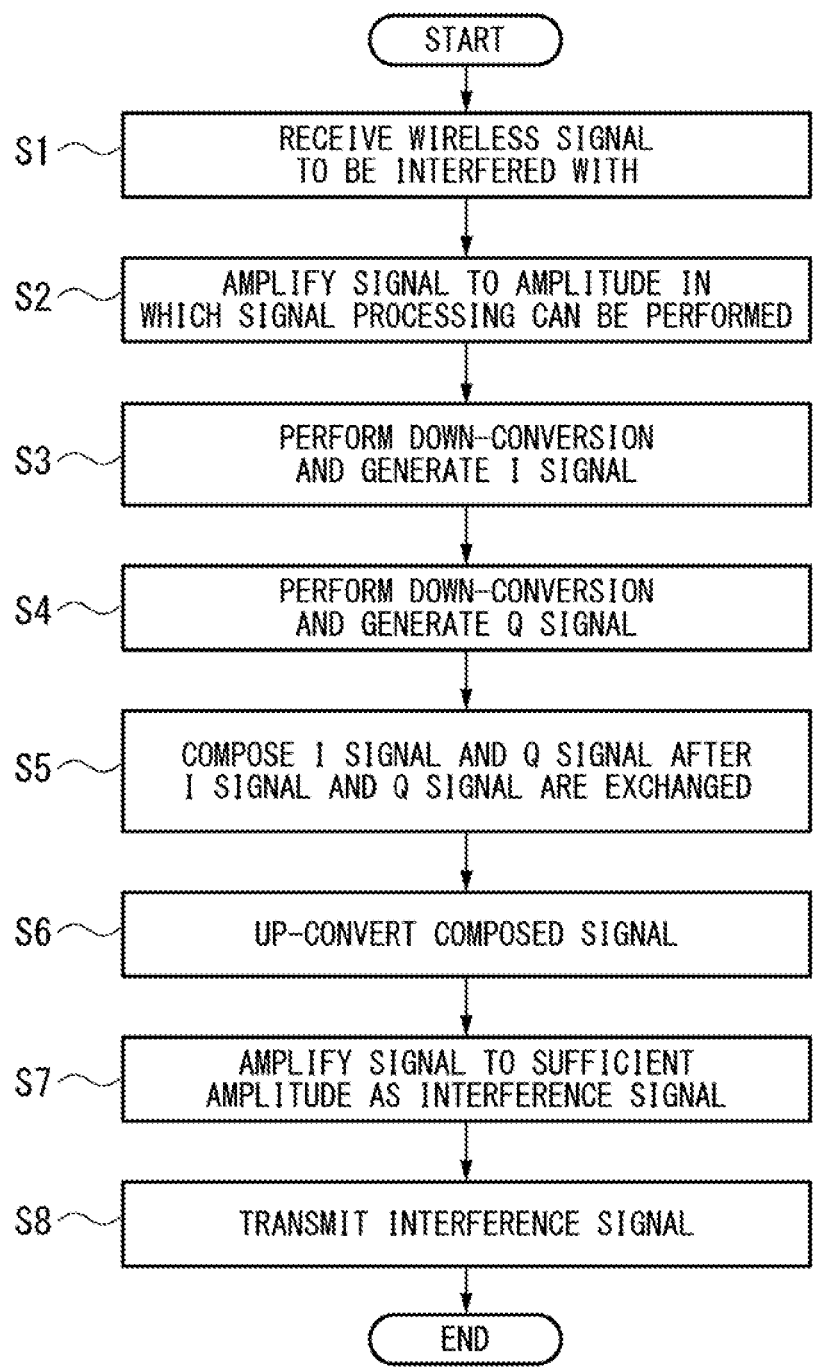
FIG. 2 is a diagram which shows a processing flow of the interference signal generation system according to the first example embodiment of the present invention.

Here, a processing flow of the interference signal generation system 1 shown in FIG. 2 will be described using a signal example shown in FIG. 3.

Note that a frequency band of wireless signals to be interfered with is known in advance and the frequency band of the wireless signals to be interfered with is set to (f1 to f2) hertz. Hereinafter, "Hertz" which is a unit of frequency will be omitted.

The first antenna 10 receives wireless signals to be interfered with (step S1). The wireless signals received by the first antenna 10 are, for example, wireless signals having a center frequency of (f1+f2)/2 shown in a part (a) of FIG. 3.

The LNA 20 receives the wireless signals received by the first antenna 10 from the first antenna 10. The LNA 20 amplifies the received wireless signals to an amplitude in which the interference signal generation device 30 can perform signal processing (step S2). The LNA 20 outputs the amplified signals to the interference signal generation device 30.

The first IQ mixer 301 receives the amplified signals from the LNA 20. The first IQ mixer 301 is a mixer of the direct conversion method. The first IQ mixer 301 down-converts the signals received from the LNA 20 using an LO signal input from the LO signal oscillator 40, and generates an I signal and a Q signal each having a direct current (DC, that is, a frequency 0) as the center frequency.

Here, a specific example in which the first IQ mixer 301 down-converts the signals received from the LNA 20 using the LO signal input from the LO signal oscillator 40 and generates an I signal and a Q signal each having the center frequency of the frequency 0 will be described.

Figure 3:
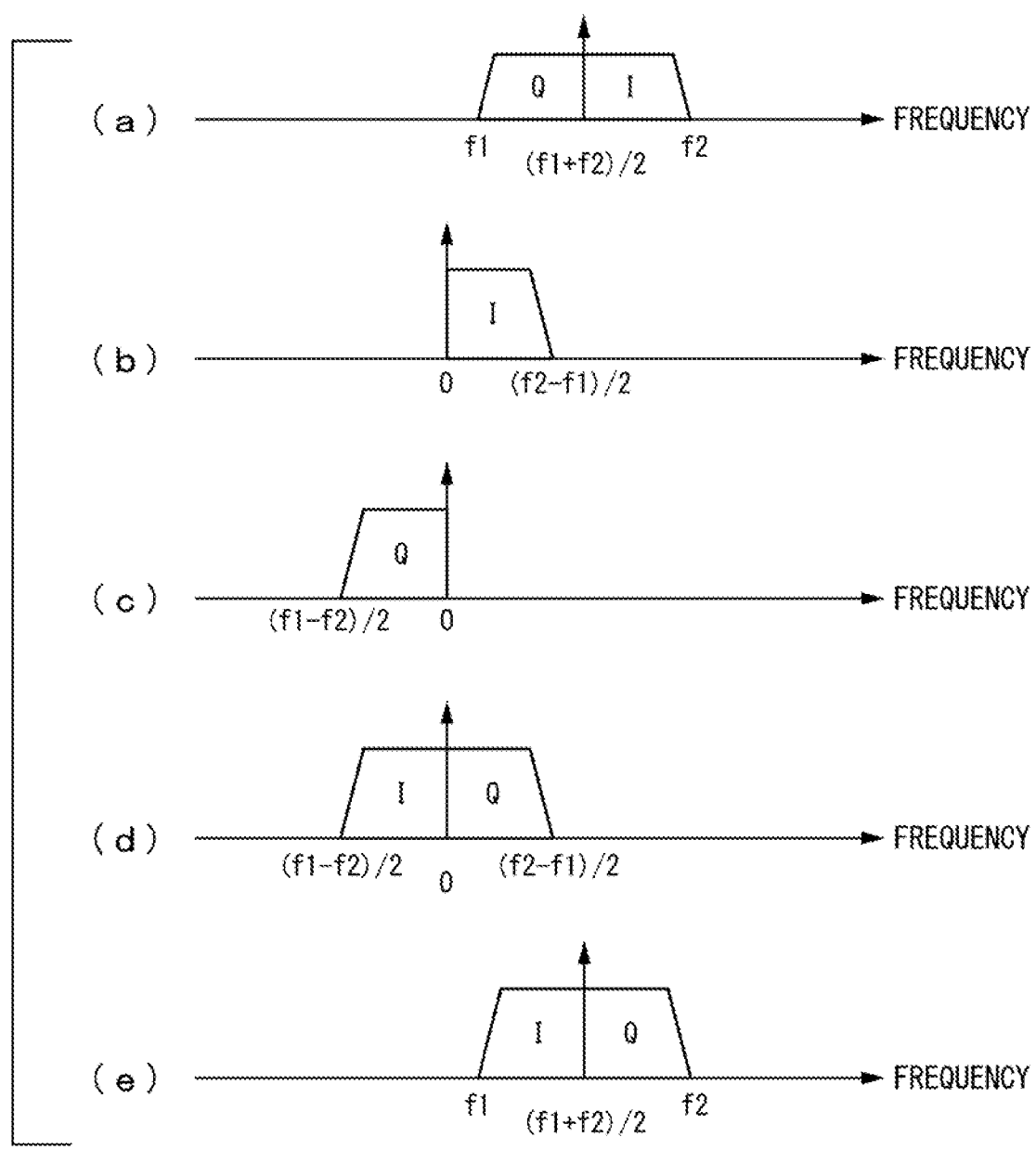
FIG. 3 is a diagram which shows a signal generated in the interference signal generation system according to the first example embodiment of the present invention.

A processing unit that processes an I signal in the first IQ mixer 301 mixes (multiplies) a signal received from the LNA 20 and a LO signal input from the LO signal oscillator 40, and generates the I signal in a frequency band (frequencies 0 to (f2−f1)/2) on a higher frequency side than the frequency 0 shown in a part (b) of FIG. 3 (step S3). In addition, a processing unit that processes a Q signal in the first IQ mixer 301 mixes a signal received from the LNA 20 and a LO signal input from the LO signal oscillator 40, and generates the Q signal in a frequency band (frequencies (f1−f2)/2 to 0) on a lower frequency side than the frequency 0 shown in a part (c) of FIG. 3 (step S4).

The first IQ mixer 301 outputs the generated I signal and Q signal to the second IQ mixer 302.

The second IQ mixer 302 receives the I signal and the Q signal from the first IQ mixer 301. Here, the I signal and the Q signal are exchanged by replacing the signal path I and the signal path Q as described above. The second IQ mixer 302 composes the I signal and the Q signal after the I signal and the Q signal are exchanged (step S5). A composite signal composed by the second IQ mixer 302 is, as shown in a part (d) of FIG. 3, a signal which has the frequency 0 as the center frequency, includes the I signal in the frequency band (frequencies (f1−f2)/2 to 0) on a lower frequency side than the center frequency, and includes the Q signal in a frequency band (0 to (f2−f1)/2) on a higher frequency side than the center frequency. The second IQ mixer 302 composes the I signal and the Q signal after performing up-conversion on each of the signals using an LO signal (step S6). The up-converted signal which is up-converted by the second IQ mixer 302 is a signal which has a frequency ((f1+f2)/2) as the center frequency as shown in a part (e) of FIG. 3, includes the I signal in a frequency band (frequencies f1 to (f1+f2)/2) on a lower frequency side than this center frequency, and includes the Q signal in a frequency band (frequencies (f1+f2)/2 to f2) on a higher frequency side than the center frequency. The up-converted signal which is up-converted by the second IQ mixer 302 shown in the part (e) of FIG. 3 has the same frequency band as the signal received by the interference signal generation system 1 shown in a part (a) of FIG. 3, but is a different signal with I and Q exchanged. That is, the up-converted signal which is up-converted by the second IQ mixer 302 is an interference signal with respect to the signal received by the interference signal generation system 1.

The second IQ mixer 302 outputs a composite signal after the up-conversion to the PA 50.

The PA 50 receives the composite signal after the up-conversion from the interference signal generation device 30. The PA 50 amplifies the received composite signal after the up-conversion to a sufficient amplitude as an interference signal (step S7). The PA 50 outputs the amplified interference signal to the second antenna 60. The second antenna 60 transmits the amplified interference signal (step S8).

As described above, the interference signal generation system 1 according to the first example embodiment of the present invention has been described.

In the interference signal generation system 1 according to the first example embodiment of the present invention, the interference signal generation device 30 includes the first IQ mixer 301 (an example of a first converter) and the second IQ mixer 302 (an example of a second converter). The first IQ mixer 301 performs conversion on a frequency of an input signal based on a center frequency of a frequency band to be interfered with. The second IQ mixer 302 further performs conversion on a frequency of an output signal of the first IQ mixer 301 based on a center frequency of a frequency band to be interfered with.

According to such a configuration, the interference signal generation system 1 can be realized by an analog circuit. For this reason, the interference signal generation system 1 can perform processing in real time. In addition, the interference signal generation system 1 can generate an interference signal of the frequency band to be interfered with, which indicates a signal different from the I signal and the Q signal in an original communication. This interference signal is not simply a signal obtained by shifting overall phases of the I signal and the Q signal, but a signal which is processed after replacing the signal path of the I signal and the signal path of the Q signal and is hard to be demodulated.

Therefore, the interference signal generation system 1 can immediately generate an interference signal when a signal to be interfered with is detected. In addition, the interference signal generation system 1 does not need to store a received signal, and can output the interference signal without delay.

Second Example Embodiment

Next, an interference signal generation system 1a according to a second example embodiment of the present invention will be described.

Figure 4:
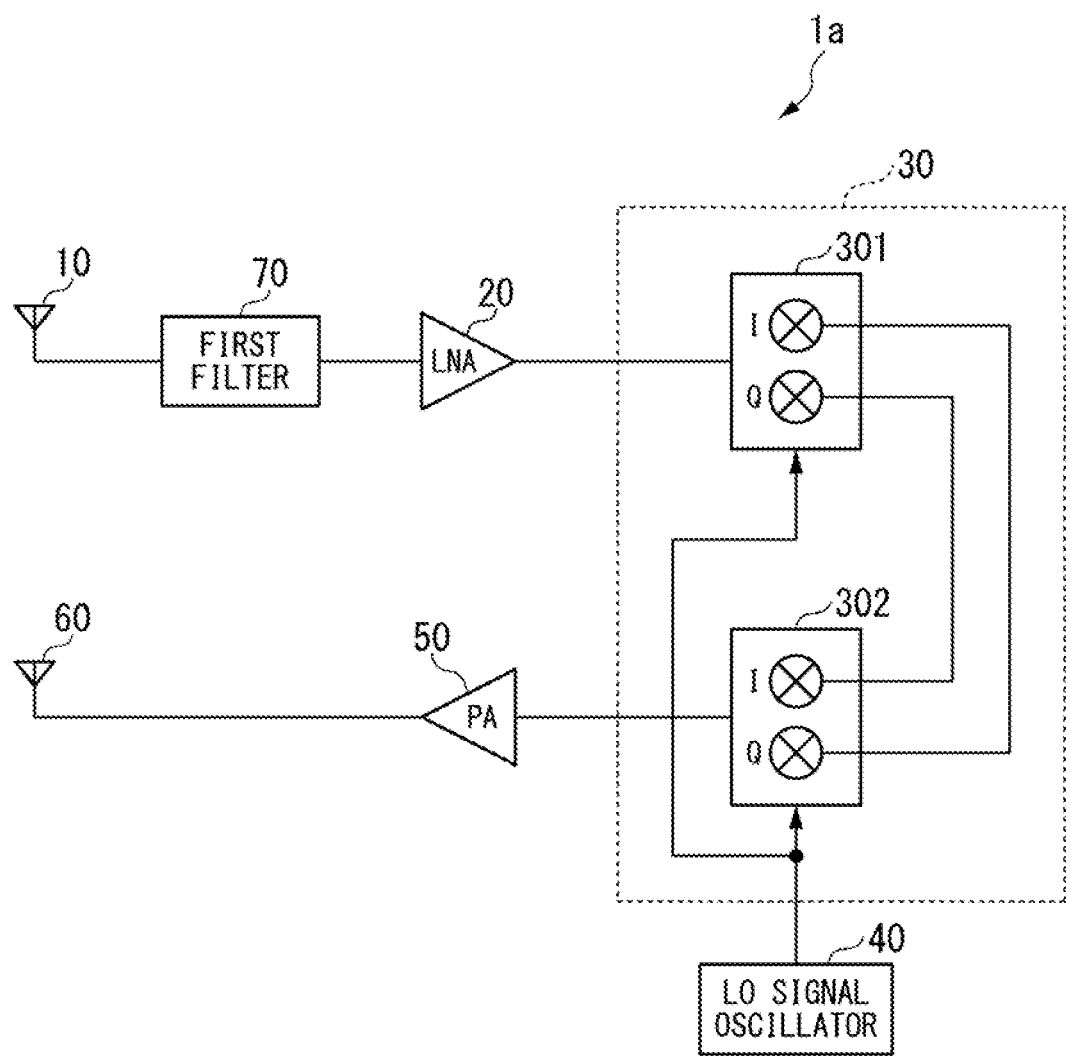
FIG. 4 is a diagram which shows a configuration of an interference signal generation system according to a second example embodiment of the present invention.

The interference signal generation system 1a according to the second example embodiment of the present invention, as shown in FIG. 4, like the interference signal generation system 1 according to the first example embodiment of the present invention, includes the first antenna 10, the LNA 20 (an example of the first amplifier), the interference signal generation device 30, the LO signal oscillator 40, the PA 50 (an example of the second amplifier), and the second antenna 60. In addition, the interference signal generation system 1a according to the second example embodiment of the present invention further includes a first filter 70. The interference signal generation system 1a is a system configured by an analog circuit. In the following description, a difference of the interference signal generation system 1a from the interference signal generation system 1 according to the first example embodiment of the present invention will be described.

The first filter 70 is a filter for selecting the frequency band to be interfered with.

Specifically, for example, the first filter 70 is a band-pass filter which transmits only signals of the frequency band to be interfered with.

Next, processing of the interference signal generation system 1a according to the second example embodiment of the present invention will be described.

Figure 5:
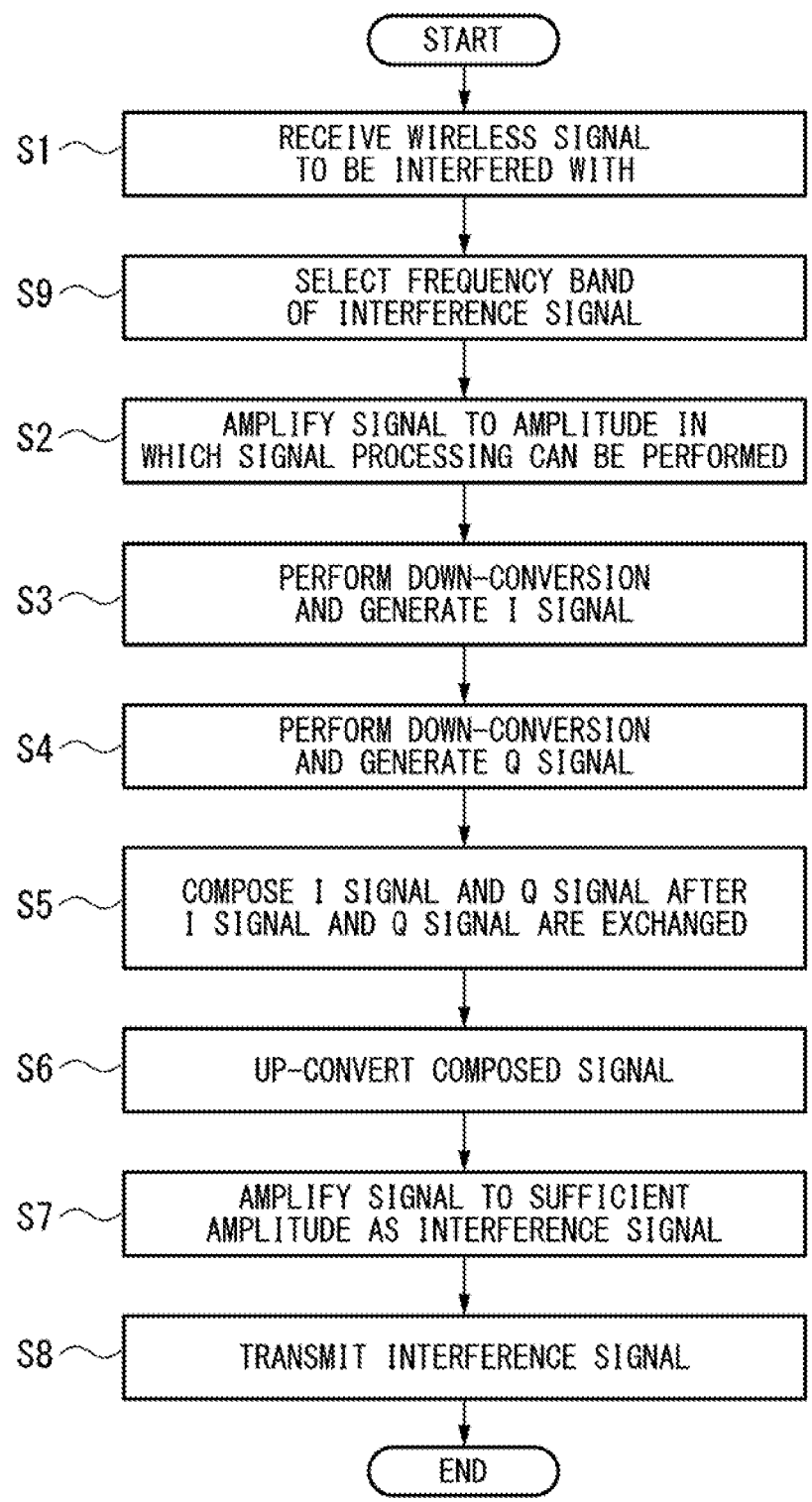
FIG. 5 is a diagram which shows a processing flow of the interference signal generation system according to the second example embodiment of the present invention.

Here, a processing flow of the interference signal generation system 1a shown in FIG. 5 will be described.

Note that, here, the frequency band of wireless signals to be interfered with is known in advance, and the frequency band of the wireless signals to be interfered with is set to (f1 to f2). In the following description, a difference from the processing flow of the interference signal generation system 1 according to the first example embodiment of the present invention will be described.

The first antenna 10 receives wireless signals to be interfered with (step S1).

The first filter 70 selects a frequency band set as one to be interfered with (step S9). Specifically, for example, the first filter 70 transmits only the wireless signals to be interfered with, which have the frequency band of (f1 to f2) among the signals received by the first antenna 10 when the first filter 70 is a band-pass filter.

The LNA 20 receives the wireless signals filtered by the first filter 70 from the first filter 70. The LNA 20 amplifies the received wireless signals to an amplitude in which the interference signal generation device 30 can perform signal processing (step S2). The LNA 20 outputs the amplified signals to the interference signal generation device 30. Then, the interference signal generation system 1a performs the processing of step S3 to step S8 in the same manner as the interference signal generation system 1 according to the first example embodiment of the present invention.

As described above, the interference signal generation system 1a according to the second example embodiment of the present invention has been described.

The interference signal generation system 1a according to the second example embodiment of the present invention includes the first filter 70. The first filter 70 selects a frequency band to be interfered with.

According to such a configuration, the interference signal generation system 1a can select a frequency band to be interfered with. As a result, the interference signal generation system 1a can select a frequency band to be interfered with when signals to be interfered with are detected, and immediately generate an interference signal in the selected frequency band.

Therefore, the interference signal generation system 1a can selectively determine a signal to be interfered with, and can avoid affecting communication using signals in the frequency band not to be interfered with.

Third Example Embodiment

Next, an interference signal generation system 1b according to a third example embodiment of the present invention will be described.

Figure 6:
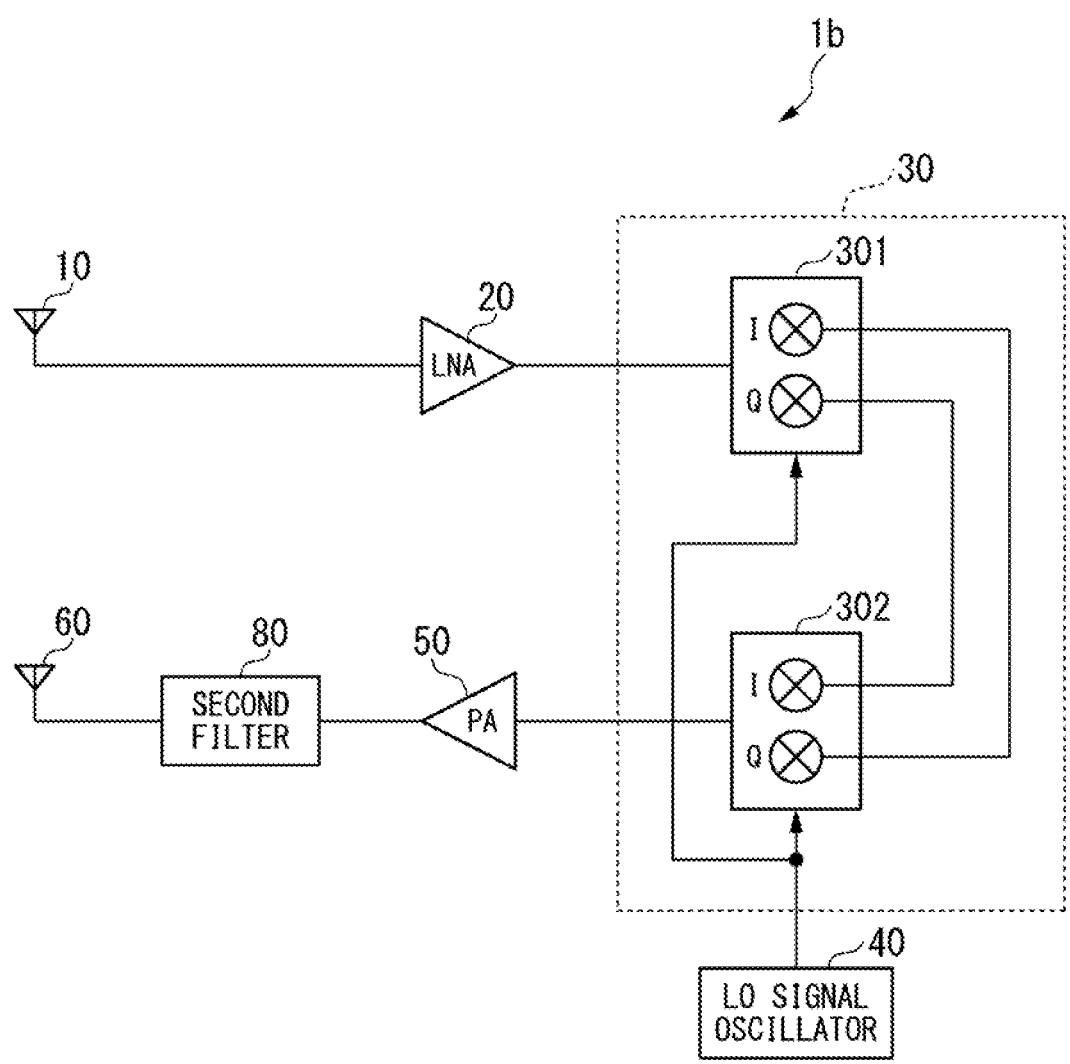
FIG. 6 is a diagram which shows a configuration of an interference signal generation system according to a third example embodiment of the present invention.

The interference signal generation system 1b according to the third example embodiment of the present invention, as shown in FIG. 6, like the interference signal generation system 1 according to the first example embodiment of the present invention, includes the first antenna 10, the LNA 20 (an example of the first amplifier), the interference signal generation device 30, the LO signal oscillator 40, the PA 50 (an example of the second amplifier), and the second antenna 60. In addition, the interference signal generation system 1b according to the third example embodiment of the present invention further includes a second filter 80. The interference signal generation system 1b is a system configured by an analog circuit.

The second filter 80 is a filter for selecting a frequency band not to be interfered with, and is a filter for preventing an interference signal from being generated in the frequency band not to be interfered with.

Specifically, for example, the second filter 80 is a band-stop filter that cuts off interference signals of the frequency band (f3 to f4) not to be interfered with. In the following description, a difference from the interference signal generation system 1 according to the first example embodiment of the present invention will be described.

Next, processing of the interference signal generation system 1b according to a third example embodiment of the present invention will be described.

Figure 7:
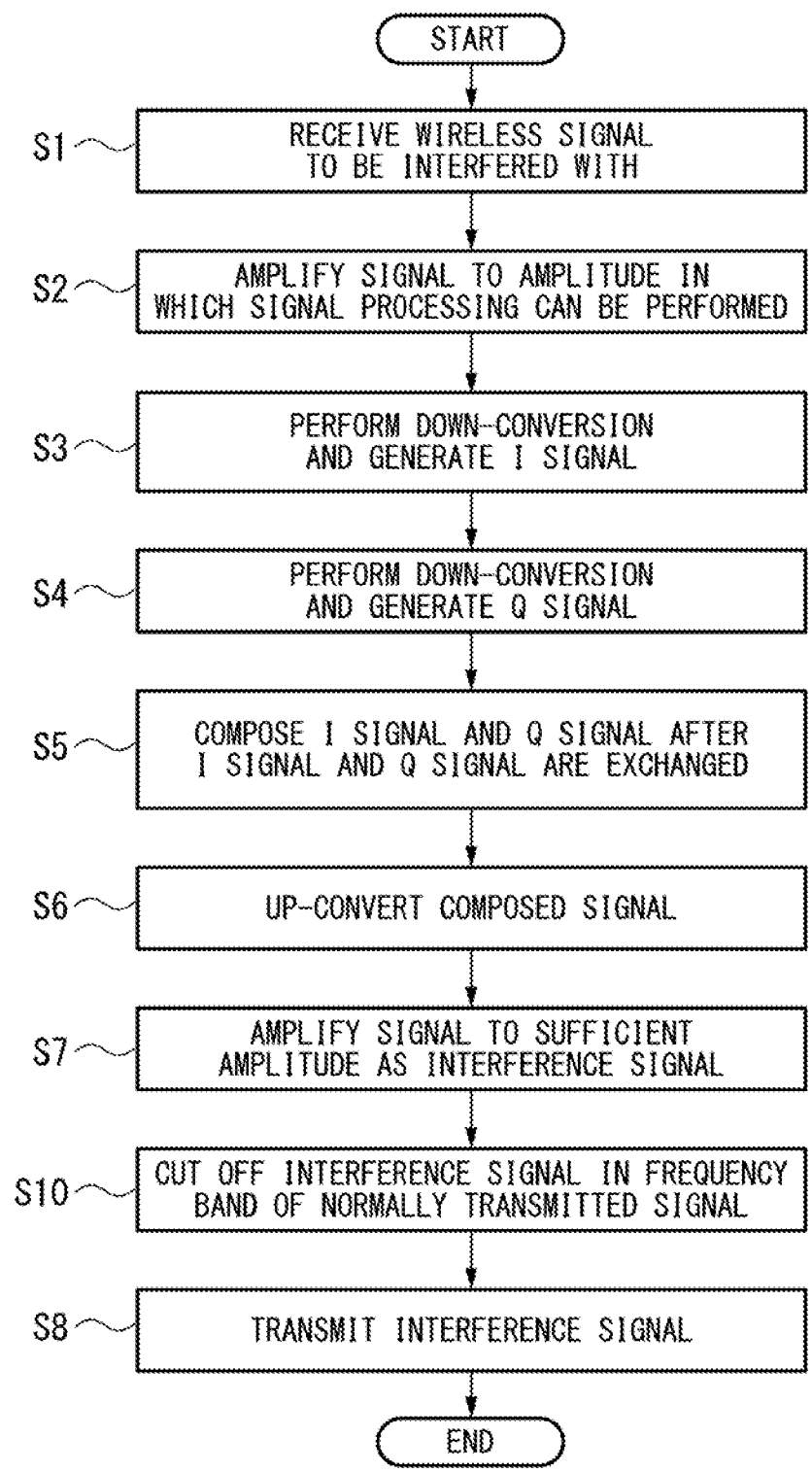
FIG. 7 is a diagram which shows a processing flow of the interference signal generation system according to the third example embodiment of the present invention.

Here, a processing flow of the interference signal generation system 1b shown in FIG. 7 will be described.

Note that, here, the frequency band of wireless signals to be interfered with is known in advance, and the frequency band of the wireless signals to be interfered with is set to (f1 to f2). In addition, it is assumed that the frequency band not to be interfered with is known as (f3 to f4) in advance. In the following description, a difference in the interference signal generation system 1b from the processing flow of the interference signal generation system 1 according to the first example embodiment of the present invention will be described.

The interference signal generation system 1b performs the processing of step S1 to step S7 in the same manner as the interference signal generation system 1 according to the first example embodiment of the present invention. The PA 50 outputs the amplified interference signals to the second filter 80.

The second filter 80 selects a frequency band not to be interfered with (step S10). Specifically, for example, when the second filter 80 is a band-stop filter, the second filter 80 cuts off interference signals of the frequency band (f3 to f4) not to be interfered with among the interference signals output from the PA 50.

The second antenna 60 transmits the amplified interference signals which have passed through the second filter 80 (step S8).

As described above, the interference signal generation system 1b according to the third example embodiment of the present invention has been described.

The interference signal generation system 1b according to the third example embodiment of the present invention includes the second filter 80. The second filter 80 selects a frequency band not to be interfered with.

According to such a configuration, the interference signal generation system 1b can select a frequency band not to be interfered with. As a result, the interference signal generation system 1b can cut off interference signals of the frequency band not to be interfered with when signals to be interfered with are detected, and immediately generate an interference signal.

Therefore, the interference signal generation system 1b can selectively determine a signal to be interfered with, and can avoid affecting communication using signals in the frequency band not to be interfered with.

Fourth Example Embodiment

Next, an interference signal generation system 1A according to a fourth example embodiment of the present invention will be described.

Figure 8:
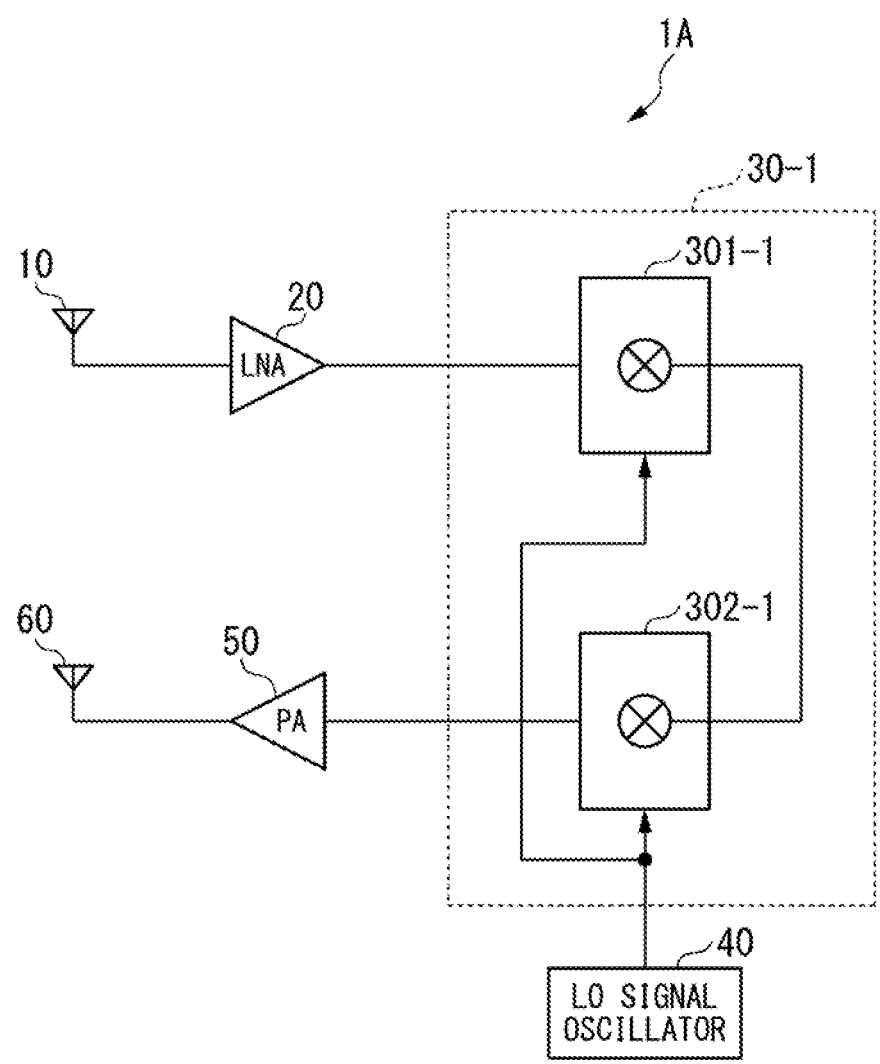
FIG. 8 is a diagram which shows a configuration of an interference signal generation system according to a fourth example embodiment of the present invention.

The interference signal generation system 1A according to the fourth example embodiment of the present invention, as shown in FIG. 8, like the interference signal generation system 1 according to the first example embodiment of the present invention, includes the first antenna 10, the LNA 20 (an example of the first amplifier), the interference signal generation device 30-1, the LO signal oscillator 40, the PA 50 (an example of the second amplifier), and the second antenna 60. The interference signal generation system 1A is a system configured by an analog circuit. Note that the interference signal generation device 30-1 according to the fourth example embodiment of the present invention is different from the interference signal generation device 30 according to the first example embodiment of the present invention.

The interference signal generation device 30-1 includes a first single mixer 301-1 (an example of the first mixer) and a second single mixer 302-1 (an example of the second mixer).

The first single mixer 301-1 receives an amplified signal from the LNA 20. The first single mixer 301-1 is a mixer that down-converts the signal received from the LNA 20 into a signal having an intermediate frequency (IF) in a heterodyne method set as the frequency 0 using the LO signal received from the LO signal oscillator 40.

The second single mixer 302-1 is a mixer that up-converts the signal down-converted by the first single mixer 301-1 into a signal having the same center frequency as the center frequency of the signal received from the LNA 20 using the LO signal received from the LO signal oscillator 40.

Figure 9:
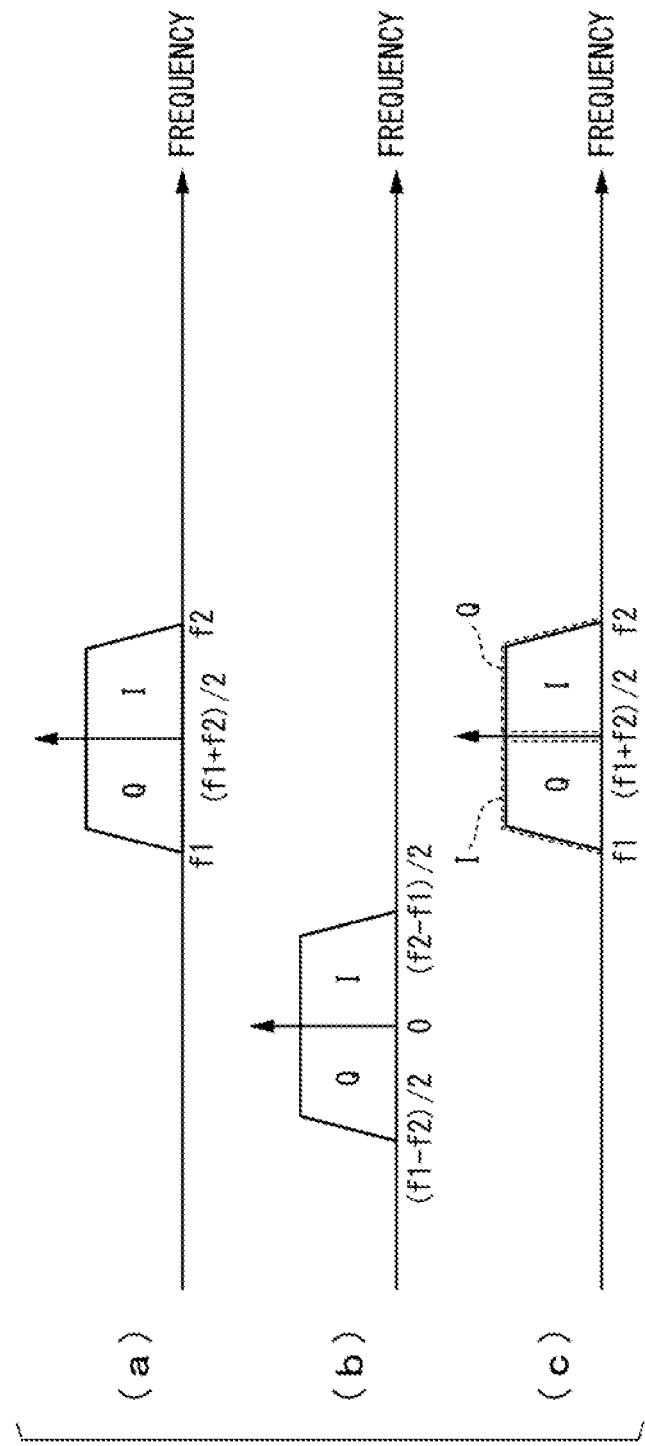
FIG. 9 is a diagram which shows a signal generated in the interference signal generation system according to the fourth example embodiment of the present invention.

Here, generation of signals by the first single mixer 301-1 and the second single mixer 302-1 will be described with reference to FIG. 9. Note that, as shown in a part (a) of FIG. 9, a frequency band of the signal received from the LNA 20 is set as (f1 to f2). Here, for convenience of description, among the signals received from the LNA 20, a signal of the frequency band (frequencies f1 to (f1+f2)/2) on a lower frequency side than the center frequency ((f1+f2)/2) in the frequency band is set as a Q signal, and a signal of a frequency band (frequencies (f1+f2)/2 to f2) on a higher frequency side than the center frequency is set as an I signal. In addition, for convenience of description, the first single mixer 301-1 and the second single mixer 302-1 receive an LO signal having the frequency fLO1 which is the same as the center frequency ((f1+f2)/2) of the frequency band of the signal received from the LNA 20 from the LO signal oscillator 40.

The first single mixer 301-1 down-converts the signal received from the LNA 20 using the LO signal received from the LO signal oscillator 40 and generates a signal having the center frequency of the frequency 0. Note that the signal down-converted by the first single mixer 301-1 is, as shown in a part (b) of FIG. 9, a signal which includes a Q signal in the frequency band (frequencies (f1−f2)/2 to 0) on a lower frequency side than the center frequency of the frequency 0 and includes an I signal in the frequency band (frequencies 0 to (f2−f1)/2) on a higher frequency side than the center frequency.

The first single mixer 301-1 outputs the generated signal having the center frequency of the frequency 0 to the second single mixer 302-1.

The second single mixer 302-1 receives the signal having the center frequency of the frequency 0 from the first single mixer 301-1. The second single mixer 302-1 up-converts the signal having the center frequency of the frequency 0 using the LO signal received from the LO signal oscillator 40, and generates a signal having the center frequency of a frequency band of the signal received from the LNA 20 ((f1+f2)/2) as the center. At this time, the signal up-converted by the second single mixer 302-1 is, as shown in a part (c) of FIG. 9, a signal which includes a Q signal in the frequency band (frequencies f1 to (f1+f2)/2) on a lower frequency side than the center frequency and an I signal that is an image signal for I signals of frequencies (f1+f2)/2 to f2, and includes an I signal in the frequency band (frequencies (f1+f2)/2 to f2) on the higher frequency side than the center frequency and a Q signal which is an image signal for Q signals of the frequencies f1 to (f1+f2)/2.

The LO signal oscillator 40 generates an LO signal used when the interference signal generation device 30-1 performs down-conversion and up-conversion.

The PA 50 amplifies an output signal of the interference signal generation device 30-1 to a sufficient amplitude as an interference signal.

The second antenna 60 transmits the signal amplified by the PA 50.

Next, processing of the interference signal generation system 1A according to the fourth example embodiment of the present invention will be described.

Figure 10:
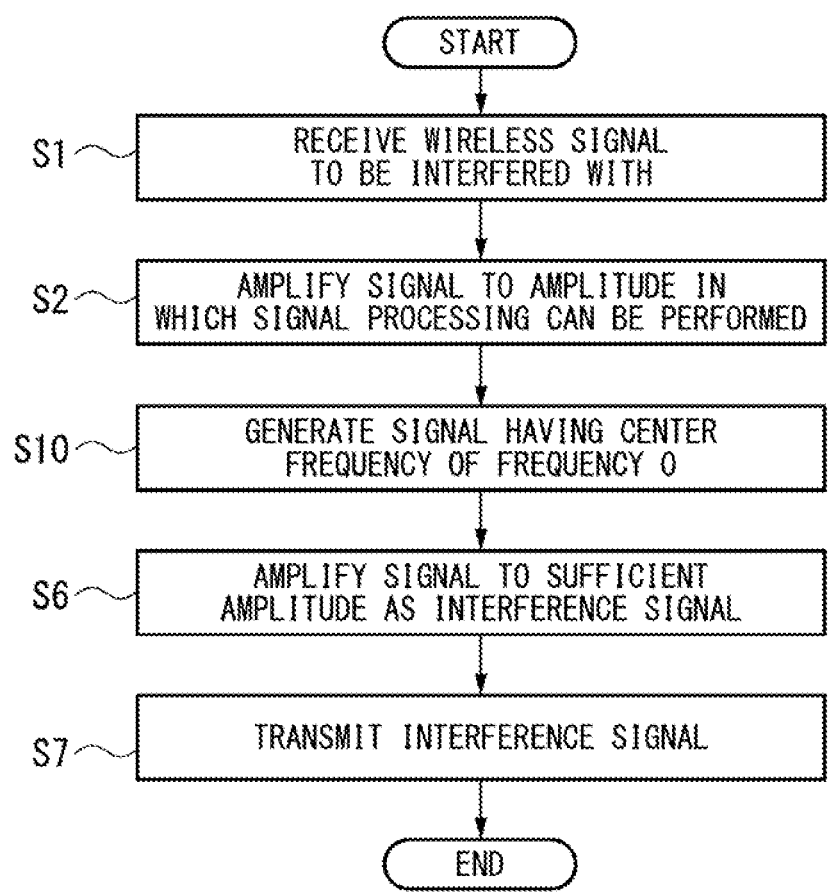
FIG. 10 is a diagram which shows a processing flow of the interference signal generation system according to the fourth example embodiment of the present invention.

Here, a processing flow of the interference signal generation system 1A shown in FIG. 10 will be described.

Note that the frequency band of wireless signals to be interfered with is known in advance, and the frequency band of the wireless signals to be interfered with is set to (f1 to f2).

The first antenna 10 receives wireless signals to be interfered with (step S1).

The LNA 20 receives the wireless signals received by the first antenna 10 from the first antenna 10. The LNA 20 amplifies the received wireless signals to an amplitude in which the interference signal generation device 30-1 can perform signal processing (step S2). The LNA 20 outputs the amplified signals to the interference signal generation device 30-1.

The first single mixer 301-1 receives the amplified signal from the LNA 20. The first single mixer 301-1 down-converts the signal received from the LNA 20 using the LO signal received from the LO signal oscillator 40, and generates, for example, a signal having the center frequency of the frequency 0 as shown in the part (b) of FIG. 9 (step S10).

The first single mixer 301-1 outputs the generated signal having the center frequency of the frequency 0 to the second single mixer 302-1.

The second single mixer 302-1 receives the signal having the center frequency of the frequency 0 from the first single mixer 301-1. The second single mixer 302-1 up-converts the signal having the center frequency of the frequency 0 using the LO signal received from the LO signal oscillator 40, and generates a signal having the center frequency the same as the center frequency ((f1+f2)/2) of a frequency band of the signal received from the LNA 20. At this time, the signal up-converted by the second single mixer 302-1 is, for example, a signal as shown in the part (c) of FIG. 9. The up-converted signal up-converted by the second IQ mixer 302-1 shown in the part (c) of FIG. 9 is a signal which has the same frequency band as the signal received by the interference signal generation system 1A shown in a part (a) of FIG. 9, but includes a different signal with the I and Q exchanged. That is, the up-converted signal up-converted by the second IQ mixer 302-1 is an interference signal with respect to the signal received by the interference signal generation system 1A.

The second single mixer 302-1 outputs the signal having the center frequency the same as the center frequency ((f1+f2)/2) to the PA 50.

The PA 50 receives the signal having the center frequency the same as the center frequency ((f1+f2)/2) from the interference signal generation device 30-1. The PA 50 amplifies the received signal having the center frequency of the frequency ((f1+f2)/2) to a sufficient amplitude as an interference signal (step S6). The PA 50 outputs the amplified interference signal to the second antenna 60. The second antenna 60 transmits the amplified interference signal (step S7).

As described above, the interference signal generation system 1A according to the fourth example embodiment of the present invention has been described.

The interference signal generation system 1A according to the fourth example embodiment of the present invention includes the first antenna 10, the LNA 20 (an example of the first amplifier), an interference signal generation device 30-1, the LO signal oscillator 40, the PA 50 (an example of the second amplifier), and the second antenna 60. The interference signal generation device 30-1 includes a first single mixer 301-1 (an example of the first mixer) and a second single mixer 302-1 (an example of the second mixer). The first single mixer 301-1 down-converts a signal received from the LNA 20 using an LO signal received from the LO signal oscillator 40, and generates a signal having the center frequency of the frequency 0. The first single mixer 301-1 outputs the generated signal having the center frequency of the frequency 0 to the second single mixer 302-1. The second single mixer 302-1 receives the signal having the center frequency of the frequency 0 from the first single mixer 301-1. The second single mixer 302-1 up-converts the signal having the center frequency of the frequency 0 using the LO signal received from the LO signal oscillator 40, and generates a signal having the center frequency of the same frequency as the center frequency ((f1+f2)/2) of a frequency band of the signal received from the LNA 20.

According to such a configuration, the interference signal generation system 1A can be realized by an analog circuit. For this reason, the interference signal generation system 1A can perform processing in real time.

Therefore, the interference signal generation system 1A can immediately generate an interference signal when signals to be interfered with are detected.

Note that, as another example embodiment of the present invention, in the interference signal generation system 1A, the frequency of an LO signal input to the first single mixer 301-1 may be different from the frequency of an LO signal input to the second single mixer 302-1. The frequency of an LO signal input to the first single mixer 301-1 is set as fLO1, the frequency of an LO signal input to the second single mixer 302-1 is set as fLO2, and, if a difference between these frequencies is less than a half of a width of the frequency band to be interfered with, the interference signal generation device 30-1 can generate an interference signal in at least a part of the frequency band to be interfered with.

Fifth Example Embodiment

Next, an interference signal generation system 1B according to a fifth example embodiment of the present invention will be described.

Figure 11:
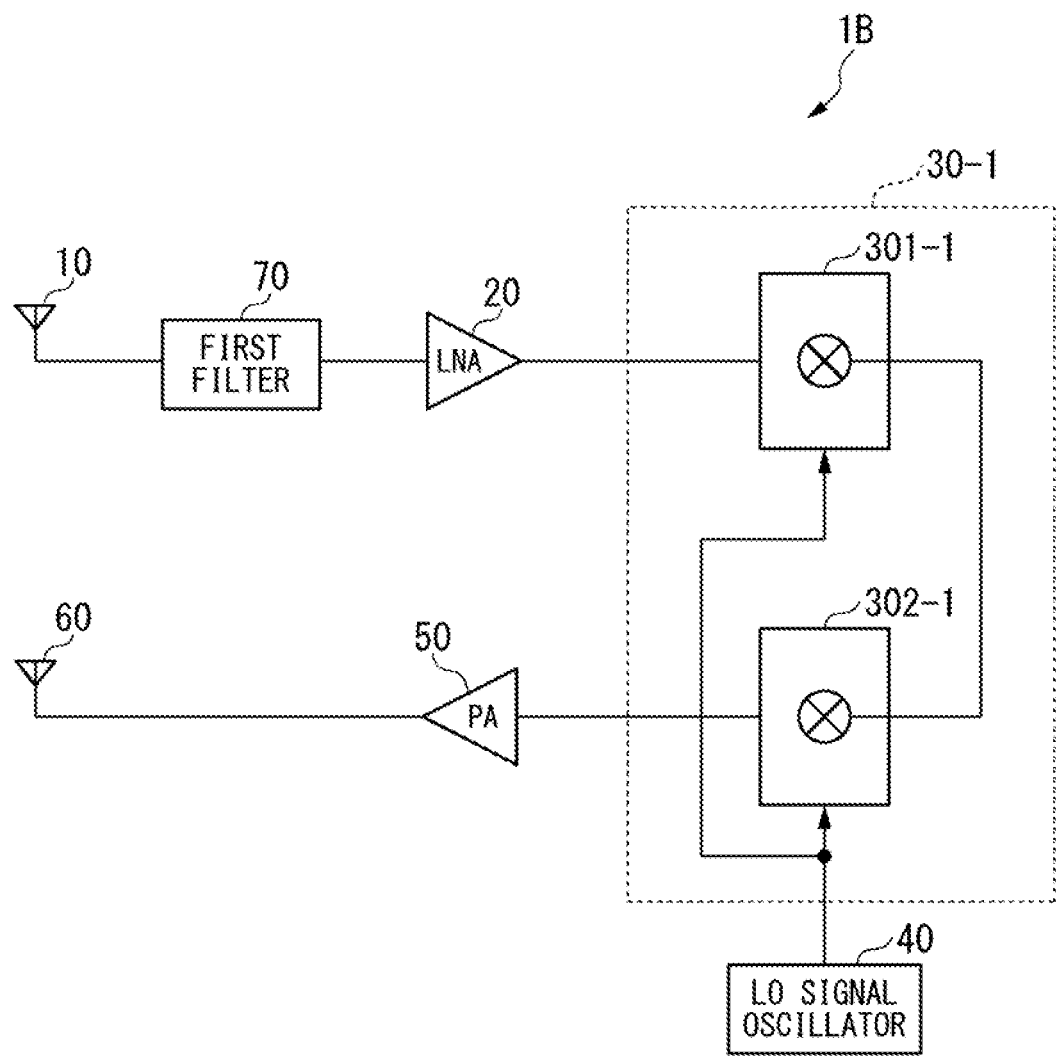
FIG. 11 is a diagram which shows a configuration of an interference signal generation system according to a fifth example embodiment of the present invention.

The interference signal generation system 1B according to the fifth example embodiment of the present invention, as shown in FIG. 11, like the interference signal generation system 1A according to the fourth example embodiment of the present invention, includes the first antenna 10, the LNA 20 (an example of the first amplifier), the interference signal generation device 30-1, the LO signal oscillator 40, the PA 50 (an example of the second amplifier), and the second antenna 60. In addition, the interference signal generation system 1B according to the fifth example embodiment of the present invention further includes the first filter 70. The interference signal generation system 1B is a system configured by an analog circuit. In the following description, a difference in the interference signal generation system 1B from the interference signal generation system 1A according to the fourth example embodiment of the present invention will be described.

The first filter 70 is a filter for selecting a frequency band to be interfered with.

Specifically, for example, the first filter 70 is a band-pass filter which transmits only signals of the frequency band to be interfered with.

Next, processing of the interference signal generation system 1B according to the fifth example embodiment of the present invention will be described.

Figure 12:
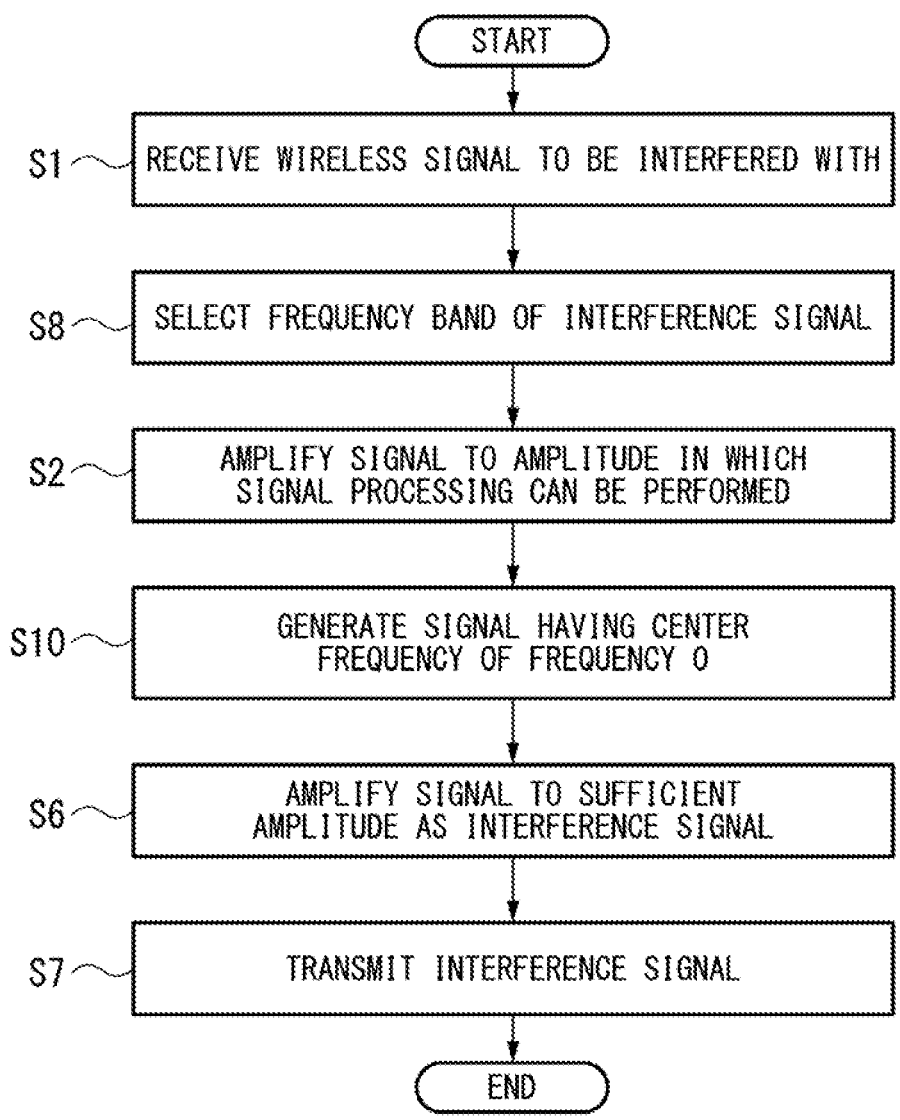
FIG. 12 is a diagram which shows a processing flow of the interference signal generation system according to the fifth example embodiment of the present invention.

Here, a processing flow of the interference signal generation system 1B shown in FIG. 12 will be described.

Note that, here, the frequency band of wireless signals to be interfered with is known in advance, and the frequency band of the wireless signals to be interfered with is set to (f1 to f2).

The first antenna 10 receives wireless signals to be interfered with (step S1).

The first filter 70 selects a frequency band to be interfered with (step S8). Specifically, for example, when the first filter 70 is a band-pass filter, the first filter 70 transmits only the wireless signals to be interfered with, which have the frequency band of (f1 to f2) among the signals received by the first antenna 10.

The LNA 20 receives the wireless signals filtered by the first filter 70 from the first filter 70. The LNA 20 amplifies the received wireless signals to an amplitude in which the interference signal generation device 30-1 can perform signal processing (step S2). The LNA 20 outputs the amplified signals to the interference signal generation device 30-1. Then, the interference signal generation system 1B performs the processing of steps S10, S6, and S7 in the same manner as the interference signal generation system 1A according to the fourth example embodiment of the present invention.

As described above, the interference signal generation system 1B according to the fifth example embodiment of the present invention has been described.

The interference signal generation system 1B according to the fifth example embodiment of the present invention includes the first filter 70. The first filter 70 selects a frequency band of an interference signal.

According to such a configuration, the interference signal generation system 1B can select a frequency band to be interfered with. As a result, the interference signal generation system 1B can select a frequency band to be interfered with when signals to be interfered with are detected, and immediately generate an interference signal.

Therefore, the interference signal generation system 1B can selectively determine a signal to be interfered with, and can avoid affecting communication using signals in the frequency band not to be interfered with.

Sixth Example Embodiment

Next, an interference signal generation system 1C according to a sixth example embodiment of the present invention will be described.

Figure 13:
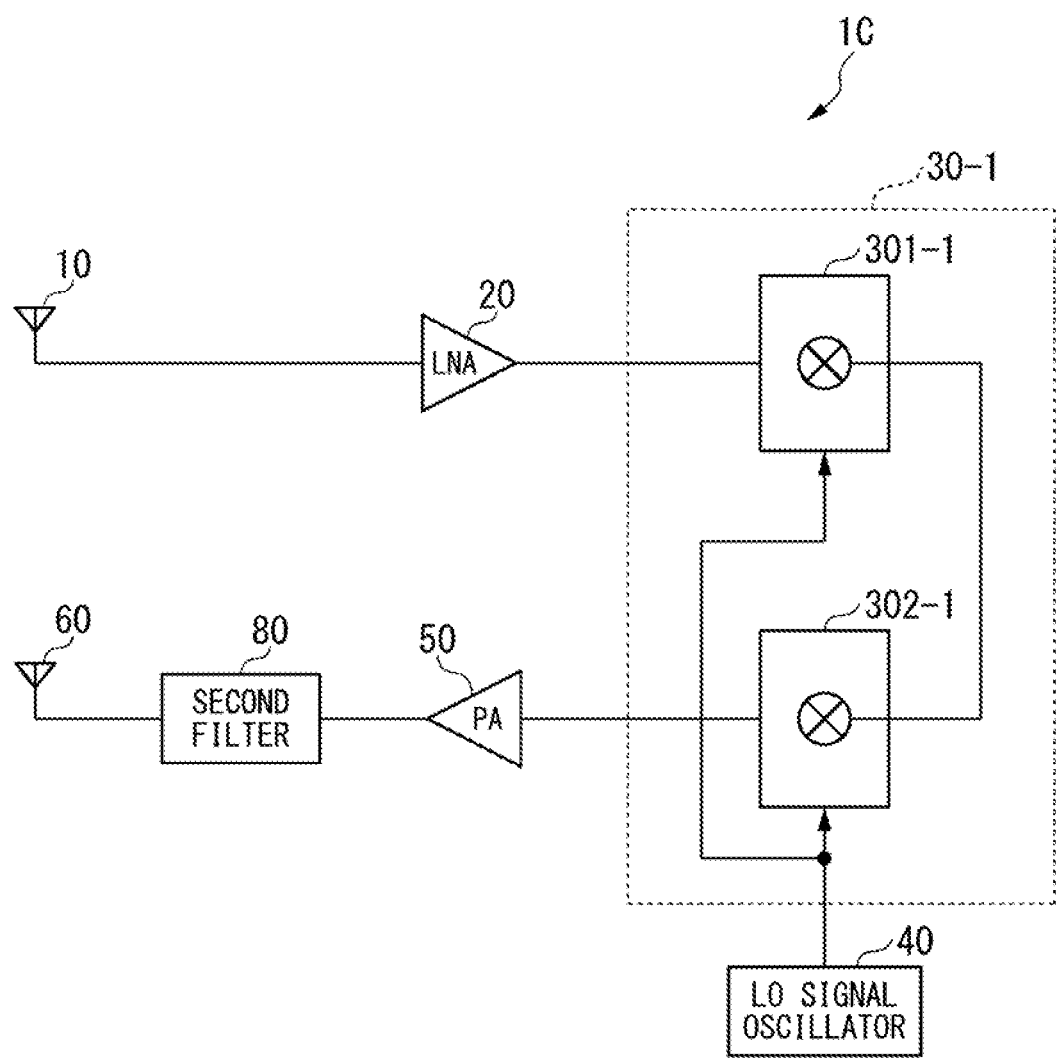
FIG. 13 is a diagram which shows a configuration of an interference signal generation system according to a sixth example embodiment of the present invention.

The interference signal generation system 1C according to the sixth example embodiment of the present invention, as shown in FIG. 13, like the interference signal generation system 1A according to the fourth example embodiment of the present invention, includes the first antenna 10, the LNA 20 (an example of the first amplifier), the interference signal generation device 30-1, the LO signal oscillator 40, the PA 50 (an example of the second amplifier), and the second antenna 60. In addition, the interference signal generation system 1C according to the sixth example embodiment of the present invention further includes the second filter 80. The interference signal generation system 1C is a system configured by an analog circuit.

The second filter 80 is a filter for selecting a frequency band not to be interfered with, and is a filter for preventing an interference signal from being generated in the frequency band not to be interfered with.

Specifically, for example, the second filter 80 is a band-stop filter that cuts off interference signals of the frequency band (f3 to f4) when the frequency band not to be interfered with is a range of the frequency (f3 to f4). In the following description, a difference from the interference signal generation system 1A according to the fourth example embodiment of the present invention will be described.

Next, processing of the interference signal generation system 1C according to the sixth example embodiment of the present invention will be described.

Here, a processing flow of the interference signal generation system 1C shown in FIG. 14 will be described.

Note that, here, the frequency band of wireless signals to be interfered with is known in advance, and the frequency band of the wireless signals to be interfered with is set to (f1 to f2). In addition, it is assumed that a frequency band not to be interfered with is known as (f3 to f4) in advance. In the following description, a difference in the interference signal generation system 1C from the processing flow of the interference signal generation system 1A according to the fourth example embodiment of the present invention will be described.

The interference signal generation system 1C performs the processing of steps S1, S2, S10, and S6 in the same manner as the interference signal generation system 1A according to the fourth example embodiment of the present invention. The PA 50 outputs the amplified interference signal to the second filter 80.

The second filter 80 selects a frequency band not to be interfered with (step S9). Specifically, for example, when the second filter 80 is a band-stop filter, the second filter 80 cuts off interference signals of the frequency band (f3 to f4) not to be interfered with among the interference signals output from the PA 50.

The second antenna 60 transmits the amplified interference signals which have passed through the second filter 80 (step S7).

As described above, the interference signal generation system 1C according to the sixth example embodiment of the present invention has been described.

The interference signal generation system 1C according to the sixth example embodiment of the present invention includes the second filter 80. The second filter 80 selects a frequency band not to be interfered with.

According to such a configuration, the interference signal generation system 1C can select a frequency band not to be interfered with. As a result, the interference signal generation system 1C can cut off interference signals of the frequency band not to be interfered with when signals to be interfered with are detected, and immediately generate an interference signal.

Therefore, the interference signal generation system 1C can selectively determine a signal to be interfered with, and can avoid affecting communication using signals in the frequency band not to be interfered with.

Another Example Embodiment

Next, an interference signal generation device 30D according to another example embodiment of the present invention will be described.

The interference signal generation device 30D according to this example embodiment includes, as shown in FIG. 15, a first converter 301D and a second converter 302D.

The first converter 301D performs conversion on the frequency of an input signal based on the center frequency of a frequency band to be interfered with.

The second converter 302D further performs conversion on the frequency of an output signal of the first converter 301D based on the center frequency.

In this manner, the interference signal generation device 30D is configured by an analog circuit, and, when a signal to be interfered with is detected, can immediately generate an interference signal in the frequency band of this signal.

An interference signal generation system 1D according to still another example embodiment of the present invention may also include any one of the interference signal generation devices 30, 30-1, and 30D, the first filter 70, and the second filter 80. Then, the interference signal generation system 1D may select a frequency band which generates an interference signal according to a combination of a pass band of a signal selected by the first filter 70 and a pass band of a signal selected by the second filter 80.

In the interference signal generation system according to each example embodiment of the present invention, the first filter 70 is not limited to a case in which it is provided between the first antenna 10 and the LNA 20. For example, as another example embodiment of the present invention, the first filter 70 may be provided between the LNA 20 and the interference signal generation device 30 in the interference signal generation system.

In the interference signal generation system according to each example embodiment of the present invention, the second filter 80 is not limited to a case in which it is provided between the PA 50 and the second antenna 60. For example, as another example embodiment of the present invention, the second filter 80 may also be provided between the interference signal generation device 30 and the PA 50 in the interference signal generation system.

Figure 16:
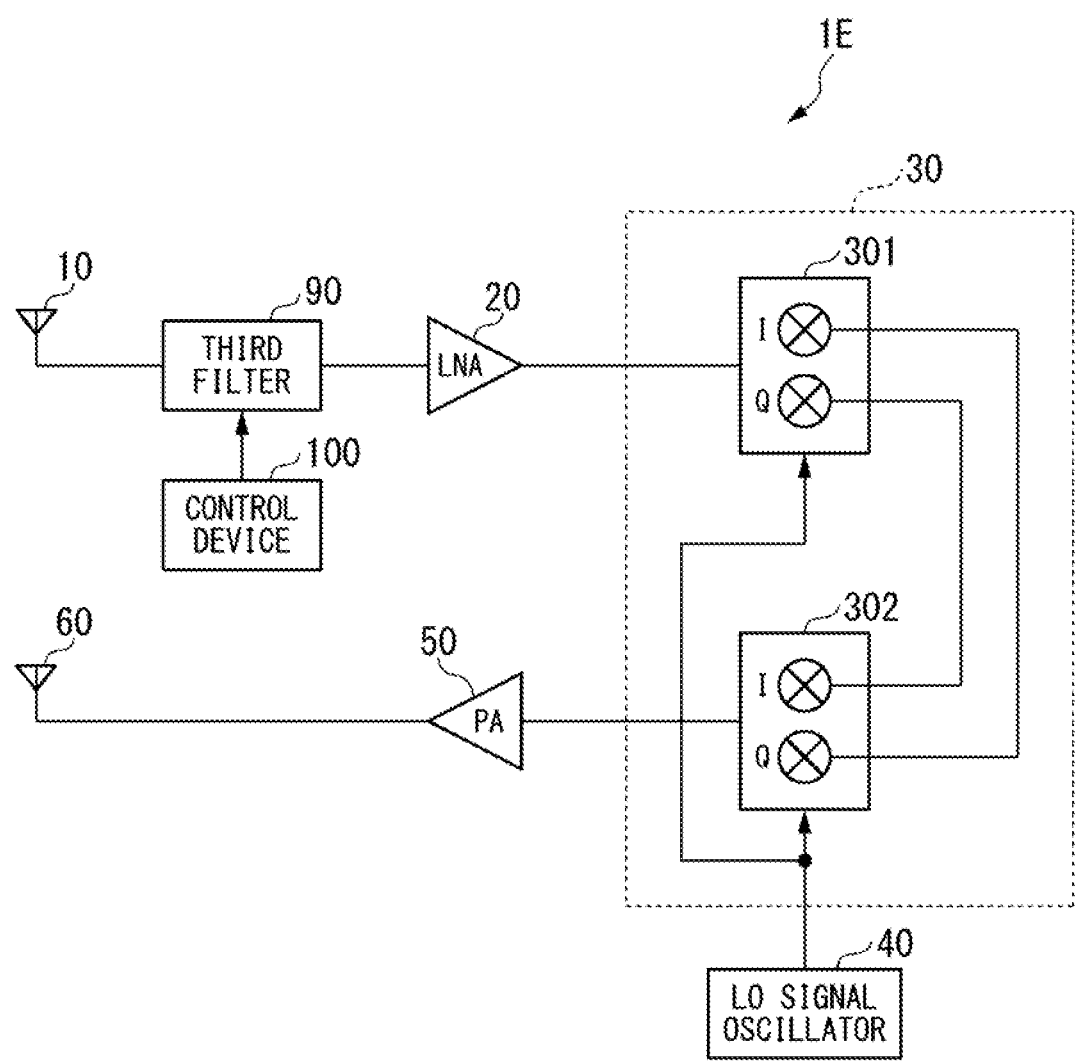
FIG. 16 is a diagram which shows a configuration of an interference signal generation system according to still another example embodiment of the present invention.

In the interference signal generation system according to another example embodiment of the present invention, the frequency band of a wireless signal to be interfered with may not be known in advance. An interference signal generation system 1E according to another example embodiment of the present invention, as shown in FIG. 16, may further include, for example, a third filter 90 and a control device 100 in addition to the configuration of the interference signal generation system 1 according to the first example embodiment of the present invention.

The third filter 90 is, for example, a band-pass filter that can change the pass band of a signal. The third filter 90 is provided, for example, between the first antenna 10 and the LNA 20.

The control device 100 is a device which changes the pass band of the third filter 90.

The interference signal generation system 1E changes the pass band of the third filter 90 using the control device 100. If a signal in the pass band of the third filter 90 is detected, the interference signal generation system 1E sets, for example, a frequency band of the detected signal as a frequency band to be interfered with. Then, the interference signal generation system 1E may perform the same processing as the interference signal generation system according to each example embodiment of the present invention described above based on a center frequency of the frequency band on the detected signal.

In the processing according to the example embodiments of the present invention, an order of processing may be changed within a range in which appropriate processing is performed.

Each of the storages or storage devices (including a register and a latch) in the example embodiments of the present invention may be provided in anywhere within a range in which transmission and reception of appropriate information are performed. In addition, each of the storages and storage devices may be provided in plural within the range in which the transmission and reception of appropriate information are performed, and may store data in a distribution manner.

The example embodiments of the present invention have been described, but the control device 100 described above and the other control devices may have a computer system therein. Then, a procedure of the processing described above may be stored in a computer-readable recording medium in the form of program and the processing may be performed by the computer reading and executing this program. A specific example of the computer is shown as follows.

Figure 17:
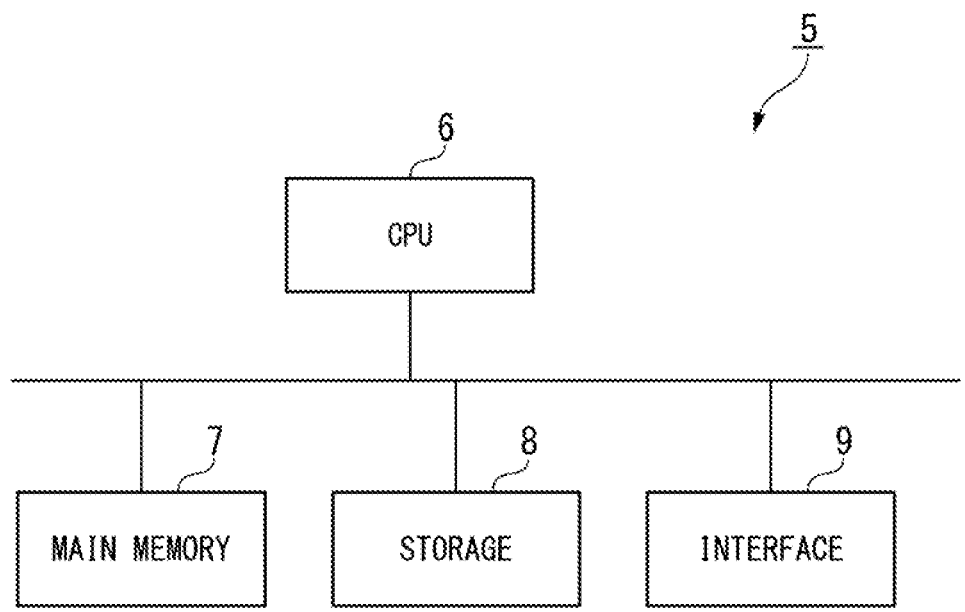
FIG. 17 is a schematic block diagram which shows a configuration of a computer according to at least one example embodiment.

FIG. 17 is a schematic block diagram which shows a configuration of a computer according to at least one example embodiment.

The computer 5 includes, as shown in FIG. 17, a CPU 6, a main memory 7, a storage 8, and an interface 9.

For example, each of the control device 100 described above and other control devices is mounted on the computer 5. Then, an operation of each processing unit described above is stored in the storage 8 in a form of program. The CPU 6 reads the program from the storage 8, loads the program in the main memory 7, and executes the processing described above according to the program. In addition, the CPU 6 ensures a storage area corresponding to each storage described above in the main memory 7 according to the program.

Examples of the storage 8 include a hard disk drive (HDD), a solid state drive (SSD), a magnetic disk, a magneto-optical disc, a compact disc read only memory (CD-ROM), a digital versatile disc read only memory (DVD-ROM), a semiconductor memory, and the like. The storage 8 may be an internal media directly connected to a bus of the computer 5 or may be an external media connected to the computer 5 via the interface 9 or a communication line. When this program is distributed to the computer 5 through the communication line, the computer 5 to which the program has been distributed may load the program in the main memory 7 and execute the processing described above. In at least one example embodiment, the storage 8 is a non-transitory tangible storage medium.

In addition, the program described above may realize some of the functions described above. Furthermore, the program described above may be a file, a so-called differential file (a differential program), which can realize the functions described above in combination with a program already recorded in a computer system.

While preferred example embodiments of the invention have been described, these example embodiments are exemplary of the invention and are not to be considered as limiting. In these example embodiments, additions, omissions, substitutions, and other modifications can be made without departing from the spirit or scope of the present invention.

This application is based upon and claims the benefit of priority from Japanese Patent Application No. 2017-182349, filed Sep. 22, 2017, the disclosure of which is incorporated herein in its entirety by reference.

INDUSTRIAL APPLICABILITY

The present invention may also be applied to an information processing system, an information processing method, and a program.

REFERENCE SYMBOLS 1, 1a, 1b, 1A, 1B, 1C, 1D, 1E: Interference signal generation system
5: Computer
6: CPU
7: Main memory
8: Storage
9: Interface
10: First antenna
20: LNA
30, 30-1, 30D: Interference signal generation device
40: LO signal oscillator
50: PA
60: Second antenna
70: First filter
80: Second filter
90: Third filter
100: Control device
301, 301-1, 301D: First mixer (First IQ mixer, First single mixer)
302, 302-1, 302D: Second mixer (Second IQ mixer, Second single mixer)

The invention claimed is:

1. An interference signal generation device comprising:
a first converter configured to generate an I signal and a Q signal by performing conversion on a frequency of an input signal based on a center frequency of a frequency band which is to be interfered with, the first converter including a first signal path for the I signal and a second signal path for the Q signal; and
a second converter configured to further perform, based on the center frequency, conversion on a frequency of each of the I signal and the Q signal generated by the first converter, the second converter including a third signal path for the I signal and a fourth signal path for the Q signal,
wherein the first signal path is connected to the fourth signal path, and the third signal path is connected to the second signal path.

2. The interference signal generation device according to claim 1, further comprising:
a band-pass filter that is provided in a front stage of the first converter,
wherein the first converter performs conversion on only signals of a frequency band that are transmitted by the band-pass filter based on the center frequency.

3. The interference signal generation device according to claim 1, further comprising:
a band-stop filter that is provided in a rear stage of the second converter, and is configured to cut off signals of frequency bands not to be interfered with.

4. The interference signal generation device according to claim 1, further comprising:
a signal generator configured to generate a signal of a predetermined frequency used when the first converter and the second converter convert a frequency.

5. The interference signal generation device according to claim 4,
wherein the signal of a predetermined frequency generated by the signal generator is a signal in a frequency range that is shifted from the center frequency by less than a half of a bandwidth of the frequency band to be interfered with.

6. The interference signal generation device according to claim 4,
wherein the signal of a predetermined frequency generated by the signal generator is a signal of the same frequency as the center frequency.

7. The interference signal generation device according to claim 1,
wherein an entirety thereof is configured by an analog circuit.

8. An interference signal generation system comprising:
a first antenna configured to receive a signal;
a first amplifier configured to amplify the signal received by the first antenna;
the interference signal generation device according to claim 1, which is configured to receive the signal amplified by the first amplifier as the input signal;
a second amplifier configured to amplify an output signal of the interference signal generation device, the output signal being generated based on a composite signal obtained by composing the I signal and the Q signal on which the conversion has been performed by the second converter; and
a second antenna configured to transmit the signal amplified by the second amplifier.

9. An interference signal generation method comprising:
generating, by a first converter, an I signal and a Q signal by performing conversion on a frequency of an input signal based on a center frequency of a frequency band which is to be interfered with, the first converter including a first signal path for the I signal and a second signal bath for the Q signal; and
performing, by a second converter, further conversion, based on the center frequency, on the converted frequency of each of the I signal and the Q signal generated by a first converter, the second converter including a third signal path for the I signal and a fourth signal path for the Q signal,
wherein the first signal path is connected to the fourth signal path, and the third signal bath is connected to the second signal path.

10. The interference signal generation method according to claim 9, comprising:
generating a third signal by performing further conversion on the frequency of each of the I signal and the Q signal on which the conversion has been performed by the second converter;
generating an output signal based on the third signal; and
transmitting the output signal from a second antenna,
wherein the input signal is a second signal generated by amplifying a first signal received by a first antenna.

* * * * *